A. A. STORY.
COFFEE-ROASTER.

No. 176,376. Patented April 18, 1876.

Witnesses
J. B. Connolly
H. B. Connolly

Inventor
Asa A. Story
By
Connolly Bros.
Attorneys

UNITED STATES PATENT OFFICE.

ASA A. STORY, OF MORRISTOWN, MINNESOTA.

IMPROVEMENT IN COFFEE-ROASTERS.

Specification forming part of Letters Patent No. 176,376, dated April 18, 1876; application filed November 6, 1875.

*To all whom it may concern:*

Be it known that I, ASA A. STORY, of Morristown, in the county of Rice and State of Minnesota, have invented a certain new and useful Improvement in Coffee-Roasters and Corn-Poppers; and I do hereby declare the following to be a full, clear, and exact description of the invention, such as will enable others skilled in the art to which it pertains to make and use it, reference being had to the accompanying drawings, which form part of this specification, in which—

Figure 1:
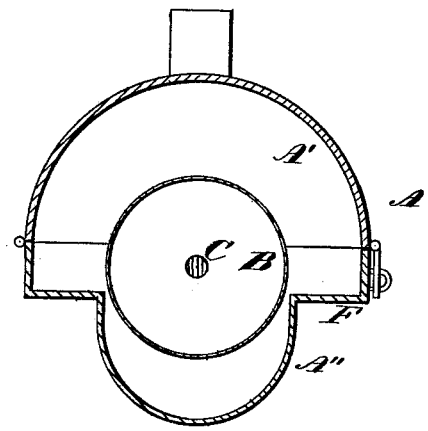
Figure 2:
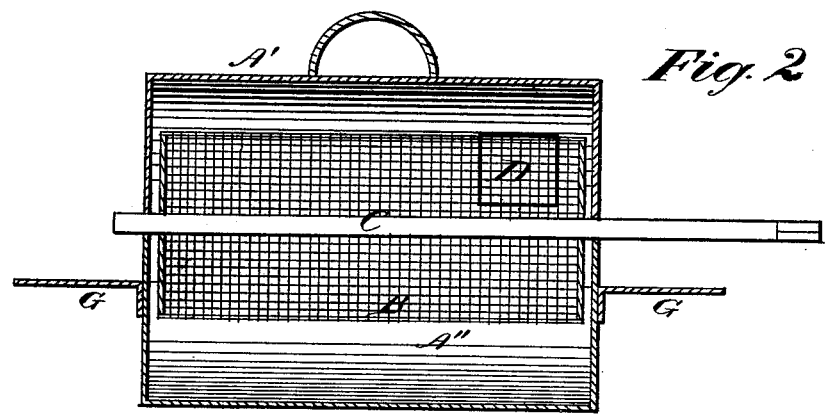

Figure 1 is a vertical transverse section, and Fig. 2 is a vertical longitudinal section, of my invention.

This invention has relation to an improved device for roasting coffee, popping corn, and like uses; and consists in the novel construction and combination of parts pertaining to an apparatus, one of the essential features of which is a rotary cylinder of woven wire, the same being supported within a concentric casing of sheet metal, flanged to rest on the top of a stove, provided with a hinged cover, and having a base adapted to fit within the fire inclosure, all as hereinafter described and specifically claimed.

Referring to the accompanying drawings, A designates a sheet-metal cylindrical casing, made in two sections, A' A'', one of which forms the base, and the other the lid, of the apparatus, within which is inclosed the rotary horizontal cylinder B, made of woven wire, or its equivalent, and provided with a shaft or journals, C, supported by and turning in recesses formed in the ends of the base-section A''. The cylinder B has an opening, D, through which the substance to be roasted is inserted or withdrawn, and this opening is furnished with a suitable cover to prevent the escape of the contents of cylinder into the casing A. A crank is employed to turn cylinder B.

To protect the contents of the apparatus from the direct action of the fire, and to prevent the escape of the aroma of coffee, &c., while permitting the moisture to be driven off, the casing is entirely closed; but sufficient heat is obtained to roast the substance thoroughly and uniformly by the provision of the flanges F at the middle of the casing, which permits the base to depend below the surface of the stove. The interior space intervening between the cylinder and base prevents the contents from being burned.

It will be observed that the flanges F are a continuation of the metal of the base, the plate being simply bent outwardly and then upwardly. To one of the rising edges the lid is hinged. The end plates G are made separate and riveted to the ends of the casing.

Having described my invention, I claim—

In a coffee or corn roaster, consisting essentially of the close box or case A, in two hinged sections, inclosing the wire-gauze or perforated rotary cylinder B, the combination, with the upper semi-cylindrical section A', of the lower section A'', having a depending semi-cylindrical base of smaller diameter than the upper section A', with flanges F bent horizontally and vertically, and constituting means for the support of the roaster upon a stove, and the hinging and locking together of the two sections, as shown and described.

In testimony that I claim the foregoing I have hereunto set my hand this 26th day of October, 1875.

ASA A. STORY.

Witnesses:
J. B. HOPKINS,
A. J. SHUMWAY.